United States Patent [19] [11] Patent Number: 4,828,480
Smith [45] Date of Patent: May 9, 1989

[54] SPRUE BUSHING WITH AUTOMATICALLY ACTIVATED GATE

[76] Inventor: Kenneth J. Smith, P.O. Box 205, Pleasant Valley Rd., Sherburne, N.Y. 13460

[21] Appl. No.: 158,118

[22] Filed: Feb. 16, 1988

Related U.S. Application Data

[63] Continuation of Ser. No. 921,476, Oct. 22, 1986, abandoned.

[51] Int. Cl.⁴ .............................................. B29C 45/30
[52] U.S. Cl. .................... 425/562; 264/328.9; 425/567; 425/569; 425/574; 425/577; 425/588; 425/DIG. 5
[58] Field of Search ............... 425/542, 567, 562, 569, 425/565, 574, 577, 588, DIG. 5; 264/328.1, 328.9

[56] References Cited

U.S. PATENT DOCUMENTS 3,283,373 11/1966 Kiefer et al. ................. 425/DIG. 5
3,779,688 12/1973 Jullien-Davin ............... 425/DIG. 5
4,473,347 9/1984 Terashima ........................... 425/562

*Primary Examiner*—Jay H. Woo
*Assistant Examiner*—Timothy W. Heitbrink
*Attorney, Agent, or Firm*—Wall and Roehrig

[57] ABSTRACT

An injection mold having a fixed mold member and a movable mold member, a sprue bushing assembly mounted in the fixed member containing an automatically actuated gate slidably mounted therein for opening and closing the sprue hole in response to the positioning of the mold members.

8 Claims, 1 Drawing Sheet

SPRUE BUSHING WITH AUTOMATICALLY ACTIVATED GATE

This is a continuation of application Ser. No. 921,476, filed Oct. 22, 1986 now abandoned.

BACKGROUND OF THE INVENTION

This invention relates to injection molding and, in particular, to a sprue bushing assembly having an automatically actuated gate that opens and closes the sprue hole in response to the opening and closing of a pair of mold members.

In most injection molding machines, flowable material such as plastic is delivered from a plasticizer to a sprue bushing located in the mold by means of a nozzle that is coupled to the bushing. The material is heated in the plasticizer and is then driven by means of a screw piston under pressure into the sprue hole of the bushing from where it is fed by means of a series of runners into one or more mold cavities. The heated material is packed into the cavities to insure that they are completely filled with material and that the molded part does not contain airholes or voids.

Generally, the mold consists of a stationary member and a movable member that coact so that the mold cavities may be opened and closed along a commonly shared parting line.

When space allows, the nozzle of the plasticizer may be equipped with a control valve which operates to regulate the flow of heated material delivered into the sprue bushing. This type of control is desirable and oftentimes necessary to prevent excessive molding material from dripping or "drooling" from the sprue hole exit during the cooling and parting of the mold members. When the material is permitted to drool, the excess material forms strings that can impede the flow of later introduced material through the runners. The strings can also become trapped between the mold member preventing the mold from properly closing and causing damage to the mold members. The strings can also be drawn into the mold cavities where they are frozen into the later molded part thereby misforming the part and rendering it unusable for its intended purpose. Machine operators sometimes see that a drip or string has formed when the mold is parted but being heated preparatory to the next molding cycle. The operator will attempt to clear the excess material by hand before the mold closes. This, of course, presents a serious hazard in that the hand can be burned or even entangled in the moving parts of the equipment. When nozzle control valves cannot be used, various temperature adjusting techniques are employed in an effort to prevent or minimize drooling. Here the injection temperature of the material is reduced incorrectly to a level where the viscosity of the material becomes considerably less than the optimum temperature needed to ideally fill the mold. Although lowering the viscosity of the material tends to minimize drooling, the reduction in injection temperatures also leads to ineffective packing of the mold cavity and the creation of unwanted voids in the finished product.

SUMMARY OF THE INVENTION

It is therefore an object of the present invention to improve molds used in injection molding equipment.

It is a further object of the present invention to provide a sprue bushing assembly for use in a mold which has an internally mounted gate for controlling the flow of molding material through the bushing.

It is a still further object of the present invention to provide a sprue bushing assembly that has an automatically operated gate which controls the flow of molding material through the sprue hole in response to the opening and closing of the mold.

Another object of the present invention is to improve the safety of injection molding equipment.

Still another object of the present invention is to minimize the formation of unwanted residue in an injection mold.

These and other objects of the present invention are attained by means of an injection mold which includes fixed and movable mold members that come together to form one or more mold cavities therebetween, the mold further including a sprue bushing assembly located in the fixed mold member having a sprue passage extending therethrough and a slidable gate positioned within the bushing that is positionable to open and close the sprue passage in response to the opening and closing of the mold cavity. The gate is operated by a cam mechanism consisting of a first cam element mounted in the fixed mold member that is operatively connected to the gate by a second cam element whereby opening and closing of the mold causes the gate to be actuated.

BRIEF DESCRIPTION OF THE DRAWINGS

For a better understanding of these and other objects of the present invention, reference is had to the following detailed description of the invention which is to read in conjunction with the accompanying drawings, wherein:

FIG. 4 is an end view in section of the mold shown in FIG. 2 further illustrating a supply nozzle operatively attached to the sprue bushing assembly for delivering heated plastic material to the mold cavities from a plasticizer or the like.

DESCRIPTION OF THE INVENTION

Figure 1:
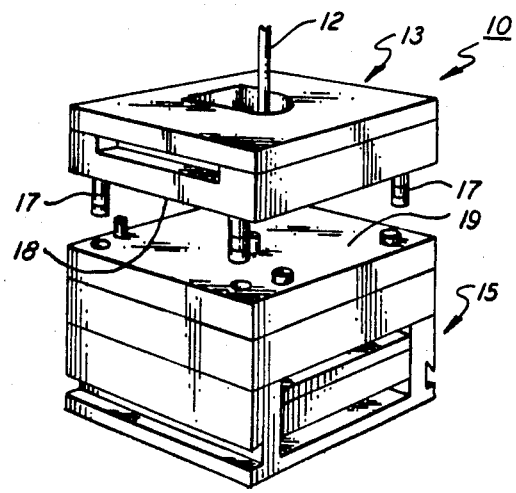
FIG. 1 is a perspective view of a two-piece mold of the type typically used in an automatic injection molding machine.

Referring initially to FIG. 1, there is shown a two-piece mold, generally referenced 10, that consists of a stationary upper member 13 and a movable lower member 15 that is arranged to move towards and away from the upper member to open and close the mold. The mold is adapted to part along a line described by the bottom surface 18 of the upper member. The movable member is guided along a vertical path of travel into closure with the upper member by guide pins 17—17. Any separable mold used to produce molded parts formed of plastic or plastic-like compounds can be used in the practice of the present invention and the invention is not limited to the specific mold structure herein illustrated. The mold is intended to be used in an automatic injection molding machine equipped with a plasticizer for heating the molding material or compound to a temperature at which it readily flows. The heated material is loaded into a screw driven piston or the like (not shown) and after the mold is closed is forced by the piston into the sprue bushing assembly 25 through nozzle 12. The material moves through the sprue bushing passage, into the runners that supply the mold cavities. The entrance area to each cavity is usually made smaller than the area of the runner so that upon removal of the molded object from the mold, the runner can be broken away from the part. Under the influence of the pump the molding compound is packed into the mold cavities.

Figure 2:
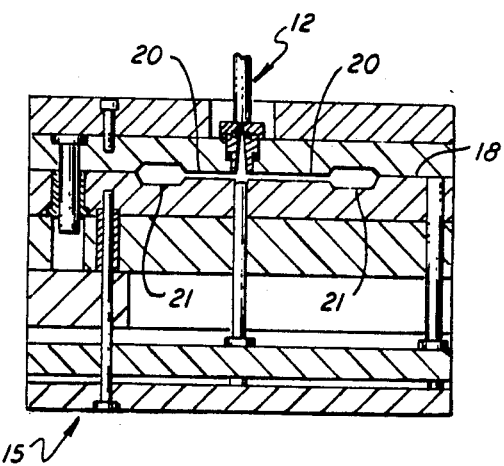
FIG. 2 is a slightly enlarged side elevation in section of the two-piece mold shown in FIG. 1 further illustrating a sprue bushing assembly embodying the teachings of the present invention.
Figure 3:
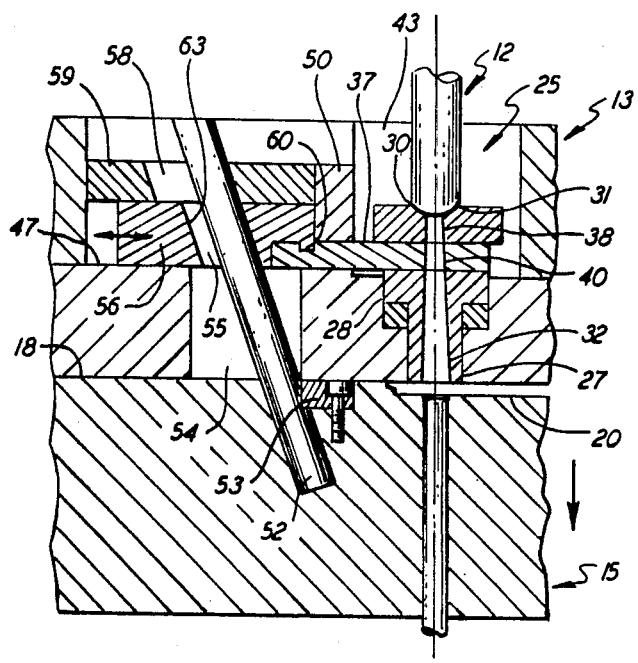
FIG. 3 is an enlarged partial view in section further illustrating the sprue bushing assembly shown in FIG. 2.
Figure 4:
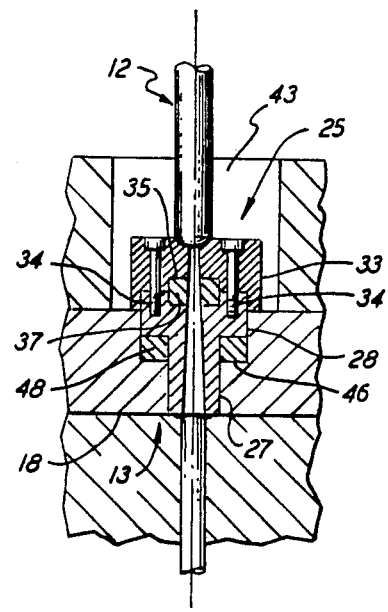

With further reference to FIGS. 2–4, a series of split mold cavities are cut or otherwise formed in the coacting faces 18 and 19 of the two mold members. The mold cavities describe the contour and texture of the molded products and the cavities are opened as the mold members are parted. As noted, flowable molding material is distributed from the supply nozzle 12 into a centrally positioned sprue bushing assembly 25 and then on to the individual cavities 21—21 by means of manifold runners 20—20. Heating elements or plates may be embedded in the mold members adjacent the runner which serve to heat the runner regions. Sufficient heat is applied to the runners to maintain the molding material in a flowable state as it flows toward the cavity whereupon the material will be packed tightly into the receiving cavity. Internal cooling means may also be provided for rapidly solidifying the molded parts once the cavities have become filled.

The nozzle 12 has a convex shaped head 30 that complements an arcuate shaped receiving cusp 31 formed in the top surface of sprue bushing assembly 25. The bushing assembly further includes a metallic body section having an upper flange 28 and a lower shank 27 through which a centrally located tapered sprue hole 32 vertically extends. A metallic cover plate 33 is placed over the flange 28 of the body section and is bolted thereto by means of a series of recessed cap screws 34—34. A horizontally disposed guideway 35 is formed between the cover plate and the flange section in which a rectangular gate 37 is slidably contained. Preferably, bushing parts are formed of machine steel and the gate is fabricated from a material marked under the name Grafmo which exhibits a high degree of lubricity and good wear resistant properties. The contacting surfaces of the guideway and the gate are machine ground to provide a good sliding fit therebetween while at the same time preventing material passing through the bushing from leaking from the sprue hole.

The cover plate contains a centrally located hole 38 of tapered configuration which, in assembly, is axially aligned with the similarly tapered hole 32 formed in the body of the sprue bushing. A tapered hole 40 is also provided within the gate which can be moved into alignment with holes 32 and 38 to establish a continuous flow passage through the sprue bushing assembly thereby placing the nozzle in fluid flow communication with the runners of the mold. The bushing assembly is mounted within a chamber 43 formed within the top surface of the stationary mold member 13 (FIG. 4). The flange 28 of the sprue bushing body section is seated upon an annular adjustment ring 48 within a recess 46 formed in the bottom of the chamber. The adjustment ring 48 is ground to a desired thickness so as to accurately position the bottom surface of the gate in sliding contact upon the lower wall 47 of the chamber. The gate extends vertically beyond the side wall of the bushing with the extended end of the gate passing through a complimentary rectangular opening formed in stop block 50 secured to the stationary mold member. A close sliding fit is provided between the gate and the walls of the opening whereby the gate can be easily moved laterally through the opening with virtually little or no vertical or side play.

An oblique dowel 52 is stacked in the movable mold member by means of a locking member 53 so that the pin will move vertically with the movable member as the mold is opened and closed. The dowel extends upwardly into the chamber 43 formed in the stationary member through an oversized aperture 54 formed in the member. The dowel also passes through an inclined slotted hole 55 formed in actuating arm 56 and a similarly inclined slotted hole 58 carried in retainer plate 59. Arm 56 is coupled to the gate by means of a key 60 adapted to be seated in a receiving groove formed in the top surface of the gate. The actuating arm is slidably contained between the retainer plate 59 and the bottom wall 47 of opening 43. The arm is thus able to drive the gate laterally within the sprue bushing assembly between a fully opened position, wherein the sprue hole is opened as shown in FIG. 3, and a fully closed position wherein the plate closes the sprue hole and thereby prevents further passage of molding material through the bushing assembly.

The gate is automatically positioned in response to the opening and closing of the mold through means of the above-noted obliquely positioned dowel 52. When the mold members are brought together in a closed position as shown in FIG. 3, the actuating arm is driven by the dowel towards the sprue bushing assembly until its lateral travel is interrupted by the stop 50. This action causes the gate to be automatically positioned within the sprue bushing assembly to align hole 40 in the gate coaxially with the holes 32 and 38 in the bushing thus opening the sprue hole passage. Upon parting the molds, the lower or movable mold member 15 along with the dowel 52 are drawn vertically away from the upper stationary member 13. The length of the inclined slotted hole 55 formed in the arm 56 is slightly larger than the diameter of the dowel 52 contained therein. The slot thus provides some lost motion between the arm and the dowel that prevents the gate from being moved back when the mold is initially parted. Accordingly, the sprue hole remains open for a short period of time when the mold members part. Any molding material that solidifies in the runners and the sprue bushing is pulled down with the moving mold member thus clearing the sprue passage of material. As the dowel continues downwardly it contacts the inside wall 63 of the slotted opening 56 whereby further opening of the mold causes the actuating arm to be drawn away from the sprue bushing thus closing the gate and preventing further molding material from moving down the sprue hole passage.

While this invention has been described with particular reference to the details as set forth above, it is not limited to the specific structure as herein disclosed and the invention is intended to cover any modifications or changes as may come within the scope of the following claims.

What is claimed is:

1. An injection mold that includes a stationary mold member, a movable mold member, a runner means formed in one of said mold members for communicating molten material to a molding cavity and at least one molding cavity formed along a parting line formed between the mold members, said mold members being arranged to move into and out of contact with each other, a sprue bushing mounted in the stationary mold member having a sprue passage for feeding molten material into said at least one molding cavity through said runner means whereby said material solidifies in the mold to produce a part, said sprue bushing including a body section and a cap section removably affixed to the body section, said cap section having a recess formed therein that complements the shape of a slidable gate member for slidably containing said gate member in the sprue bushing, said gate member being slidably mounted in a guideway formed in the sprue bushing, said gate member having a hole formed therein, a camming means affixed to the movable mold member for movement therewith for placing the gate member in a sprue opening position wherein the hole is in alignment with the sprue passage when the mold members are in contact and to automatically move said gate member to a sprue closing position as the mold members are parted, wherein the hole is out of alignment with the sprue passage, a delay means associated with the camming means for holding said gate member in a sprue opening position for a predetermined period of time as the mold members begin to part to permit solidified material in the sprue passage to be removed from said passage by the parting mold members prior to said gate member being moved to a sprue closing position.

2. The mold of claim 1 wherein the gate member is a rectangular shaped plate.

3. The mold of claim 1 that further includes a stop means for interrupting the travel of the gate member to align said hole with said sprue passage.

4. The mold of claim 1 wherein said camming means is an inclined column that is slidably received in an elongated slot formed in the plate so that the axes of the slot, the inclined column and the sprue passage all lie in a common plane.

5. In an injection mold having a stationary upper member and a movable lower ember which are separated along a common parting line, a runner means formed in one of said mold members for communicating molten material to a molding cavity and at least one molding cavity formed in the mold members along the common parting line, the improvement comprising:

a sprue bushing for mounting in the upper member having a central passage vertically disposed therein for feeding molten material into the runner means for delivery into at least one molding cavity, said sprue bushing having an expanded head with a horizontally disposed groove in its top surface that passes through the sprue passage, a gate member slidably positioned in the groove for movement between a sprue opening position wherein molten material is permitted to flow through the sprue passage and a sprue closing position wherein molten material is prevented from flowing through said sprue passage, a cover means secured to the head of the sprue bushing for slidably retaining the gate member in said groove, camming means driven by said movable mold member for moving the gate member laterally in the groove to an open position when the two mold members are in contact along the parting line and to a closed position when the mold members are separated, and a delay means associated with the camming means for holding the gate member in an open position for a predetermined period of time as the mold members begin to separate to permit molding material that might have solidified in the sprue passage to be removed from said passage by the separating action of the mold members before the gate is moved to a closed position.

6. The injection mold of claim 5 wherein said cover means has an opening that communicates with the sprue passage and a seat at the entrance to the opening for receiving an injection nozzle.

7. The injection mold of claim 5 wherein said camming means is an inclined member that is secured in the movable mold member and said delay means includes an elongated groove in which the inclined member rises.

8. The injection mold of claim 5 wherein the gate member is a flat plate having a vertically disposed hole which is placed in alignment with the sprue passage when said gate is in the open position.

* * * * *